T. F. TYLER.
HOSE CLAMP.
APPLICATION FILED OCT. 4, 1917.

1,262,413. Patented Apr. 9, 1918.

T. F. Tyler
Inventor

By Geo. P. Kimmel
Attorney

UNITED STATES PATENT OFFICE.

THADDUES F. TYLER, OF BRADFORD, MASSACHUSETTS.

HOSE-CLAMP.

1,262,413.　　　　　Specification of Letters Patent.　　Patented Apr. 9, 1918.

Application filed October 4, 1917. Serial No. 194,759.

*To all whom it may concern:*

Be it known that I, THADDUES F. TYLER, a citizen of the United States, residing at Bradford, in the county of Essex and State of Massachusetts, have invented certain new and useful Improvements in Hose-Clamps, of which the following is a specification.

This invention relates to hose connections and the invention has more especial reference to an improved hose clamp.

The invention has for its dominant object to provide a hose clamp capable of being adjusted to permit use of the same in connection with hose varying in diameters and serving as means for producing a positive and fluid tight connection.

Another and equally important object of the invention is to provide a novel form of fastening, whereby the ends of the clamp will be tightly drawn into engagement with the hose and couplings.

Other independent objects are to provide features of construction of portions of the clamp which tend toward the attainment of the above aims irrespective of the relation in which they are used.

Other objects will be in part obvious and in part pointed out hereinafter.

The invention accordingly consists in the features of construction, combination of elements and arrangement of parts which will be exemplified in the construction hereinafter set forth, and the scope of the application of which will be indicated in the following claims.

In the accompanying drawings, wherein is shown one of various possible embodiments of my invention, Figure 1 is a vertical section through the improved clamp;

Similar characters of reference refer to similar parts throughout the several views of the drawings.

Figure 1:
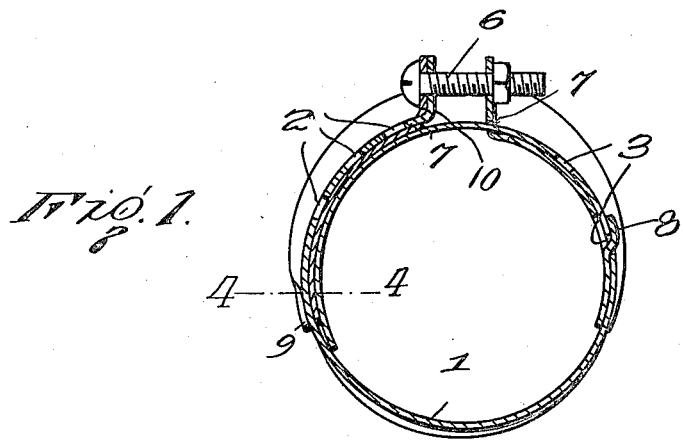
Figures 2, 3:
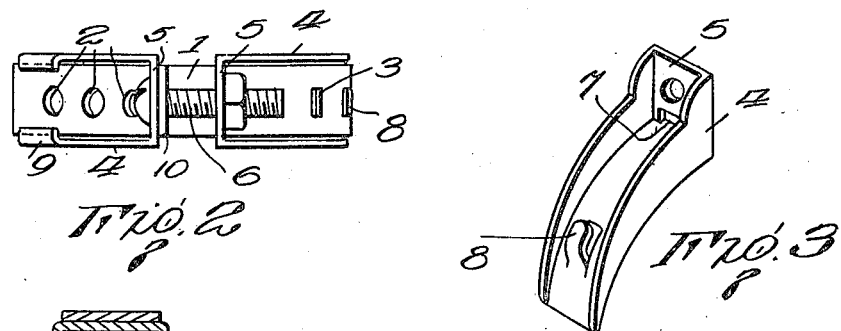
Fig. 2 is a top plan thereof.
Fig. 3 is a detail in perspective of one of the brackets.
Figure 4:
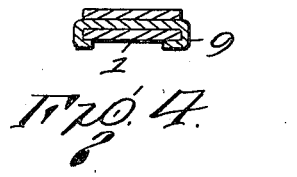
Fig. 4 is a section taken on the line 4—4 of Fig. 1.

Having more particular reference to the drawings, the clamp includes a flexible band represented by the numeral 1 having a series of openings generally indicated by the numeral 2 formed in one end thereof while slots 3 are formed in the remaining end of the same.

Brackets 4 and 5 are provided and are substantially identical in construction; the said brackets comprising segmental body portions formed of metal or other suitable material and having end walls 5 formed thereon. As will be noted, openings are formed in the end walls 5 and serve as means for permitting the passing of a connecting bolt 6 therethrough at times. Slots 7 are formed in the brackets at points in proximity of the lower portions of the end walls 5, while an offset tongue 8 is struck upwardly from one of the same and serves for a purpose which will be presently apparent. The remaining bracket 4 has a portion of the same bent upon itself as at 9 to provide an efficient guide way for the flexible band 1, thus, serving as means for preventing undue disarrangement of the same with relation to the said bracket.

In assembling the improved hose clamp, the ends of the flexible band 1 are passed through the slots 7 formed in each of the brackets 4. That end of the band which is provided with the series of openings 2 is bent upwardly as shown at 10 in the Fig. 1 whereupon one of the openings 2 will aline with the opening formed in the adjacent end wall 5. The remaining end of the band is arranged to overlap the first mentioned end of the same and as a consequence, will insure proper engagement with the hose to be clamped thereby at all points. To prevent undue movement of the end of the band 1 having the slots 3 formed therein, the offset tongue 8 is engaged in one of the same as shown in the Fig. 1, thus, effecting a positive connection between its respective bracket 4 and the said end. The bolt 6 is now passed through the openings formed in the end walls 5 and through the alined opening 2 formed in one end of the clamping band 1, whereupon a locking nut is turned into engagement with the said bolt and tightened to draw the band tightly into engagement with the hose at all points thereabout, thereby effecting a positive and fluid tight connection between the hose and its coupling.

It will be readily understood, that the clamp may be adjusted for arrangement about hose varying in diameters by alining the various openings 2 formed in one end of the band with the opening formed in the end wall of the adjacent bracket 4 and by engaging the different slots 3 formed in the remaining end of the band with the offset tongue 8 formed on the remaining bracket 4.

Figure 5:
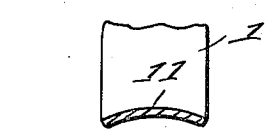
Fig. 5 is a transverse section through the flexible band of the clamp.

If desired, the flexible band 1 may be formed convex as shown in the Fig. 5 and indicated by the numeral 11, thus permitting the same to snugly engage in the corrugated portion formed in the conventional type of hose couplings. In this way, lateral play of the hose clamp is avoided and as a consequence, a fluid connection insured.

Manifestly, the construction shown is capable of considerable modification and such modification as is within the scope of my claims, I consider within the spirit of my invention.

I claim:—

1. A hose clamp including a flexible band having openings formed in the opposite extremities thereof, brackets receiving the opposite extremities of said band therethrough, one of said brackets having an offset tongue adapted to be engaged with the openings in one extremity of the flexible band, the openings in the remaining extremity of the band being adapted to be alined with one end of the remaining bracket, and means passing through said brackets and the alined opening in said remaining end of the flexible band for connecting the same.

2. A hose clamp including a flexible band having openings formed in the opposite extremities thereof, segmental brackets having apertured end walls and slots formed therein for receiving the opposite extremities of the flexible band therethrough, an offset tongue struck from one of the brackets and engageable with the openings formed in one extremity of said flexible band, the openings in the remaining extremity of said flexible band being adapted for alinement with the apertured wall of the remaining bracket, and connecting means passing through said apertured walls and the alined openings in the remaining end of the flexible band.

3. A hose clamp including a flexible convex band, curved brackets having apertured end walls and slots formed therein for receiving the opposite extremities of the flexible band therethrough, said band having openings formed in the opposite portions thereof, a tongue struck from one of the brackets and receivable in the opening of one portion of the flexible band, the opening in the remaining portion of said band being adapted for alinement with the apertured wall in the remaining bracket, a bolt passing through the apertured walls and the opening in said remaining bracket of the flexible band, and a nut turned into engagement with said bolt.

In testimony whereof, I affix my signature hereto.

THADDUES F. TYLER.